United States Patent [19]

Holland

[11] Patent Number: 4,773,319
[45] Date of Patent: Sep. 27, 1988

[54] BARBECUE GRILL AND COOKER

[76] Inventor: Robert B. Holland, 247 Summerwinds Dr., Cary, N.C. 27511

[21] Appl. No.: 148,075

[22] Filed: Jan. 25, 1988

[51] Int. Cl.⁴ .................... A47J 27/00; A47J 37/00
[52] U.S. Cl. .......................... 99/446; 99/447; 99/450; 126/25 R; 126/41 R
[58] Field of Search ...................... 99/444-446, 99/450, 401, 447, 402, 425, 419, 421 H, 408; 126/25 R, 41 R; 431/328, 329

[56] References Cited

U.S. PATENT DOCUMENTS

| | | | |
|---|---|---|---|
| 3,040,651 | 6/1962 | Nolte, Jr. | 99/446 |
| 3,593,647 | 7/1971 | Copeland, Jr. | |
| 3,809,053 | 5/1974 | Navarrd | 99/421 H |
| 4,043,312 | 8/1977 | Kern | 126/41 R |
| 4,108,142 | 8/1978 | Barson et al. | 126/41 R |
| 4,276,869 | 7/1981 | Kern | 126/41 R |
| 4,290,408 | 9/1981 | Juett et al. | 126/25 R |
| 4,362,093 | 12/1982 | Griscom | 99/446 |
| 4,403,597 | 9/1983 | Miller | 126/41 R |
| 4,572,062 | 2/1986 | Widdowson | 99/447 X |
| 4,627,408 | 12/1986 | Schlosser | 126/41 R |
| 4,662,349 | 5/1987 | McKenzie et al. | 126/41 R |
| 4,683,867 | 8/1987 | Beatty | 126/41 R |
| 4,694,816 | 9/1987 | Fabbro | 126/41 R |

Primary Examiner—Timothy F. Simone
Attorney, Agent, or Firm—Richard E. Jenkins

[57] ABSTRACT

A barbecue grill including a housing having a bottom surface, a heat source adjacent the bottom surface, a heat deflector positioned above the heat source for uniform heat distribution, a grease collection and drainage system, a food supporting grate and a removable hood. Heat is evenly distributed throughout the housing by the heat deflector, and grease from food on the food supporting grate is efficiently collected and disposed of by the grease collection and drainage system. The grease collection and drainage system is adapted to easily convert the barbecue grill to use as both a smoker and a steamer.

20 Claims, 3 Drawing Sheets

BARBECUE GRILL AND COOKER

TECHNICAL FIELD

The present invention relates generally to the art of cooking meats and other foods on outdoor grills. More particularly, the present invention relates to an improved barbecue grill which totally eliminates flaming, is highly fuel efficient, helps retain the natural juices of food being cooked, and is easily converted for use as a steamer or smoker.

BACKGROUND ART

Outdoor grills have gained in popularity in recent years, and grill manufacturers are continually striving to develop an outdoor grill that will safely and efficiently cook meat and other foods while retaining the natural flavor of the food being cooked. For example, gas and electric grills with permanent briquettes have recently begun to replace conventional grills which use combustible charcoal briquettes. However, the permanent briquettes associated with current gas and electric grills have a tendency to collect grease from food being cooked and thereby provide a cooking environment very susceptible to unwanted flaming which can burn and/or dry out meats or other foods being cooked. Furthermore, the burner units associated with conventional gas and electric grills tend to unevenly heat the permanent briquettes and therefore create "hot spots" on the grilling surface resulting in uneven cooking of the food placed thereon and inefficient use of the fuel or heat source utilized therewith. Still another disadvantage associated with conventional grills is the difficulty in cooking large pieces of meat such as turkeys and hams which often require longer cooking times and have a tendency to lose their natural juices during such prolonged cooking periods.

One attempt to divert grease drippings away from direct contact with the flame and to reduce flaming in a gas grill is disclosed in U.S. Pat. No. 3,593,647. An inverted conical plate extending across a cylindrical housing and positioned between the gas burner and grill is described which collects grease and drippings in a collecting cup directly above the flame from a burner unit. This particular design, however, creates a substantial fire hazard since the grease collects directly above the flame of the burner and is not diverted out of the housing.

Another grill designed to prevent grease drippings from directly contacting the heat source and the resulting flaming is described in U.S. Pat. No. 3,040,651 wherein a cone-shaped partition located above a fire pan in a charcoal grill housing is described. Drippings from food fall into the partition and travel down the walls of the partition into a tubular support which disposes of the grease on the ground through an opening in the bottom of the fire pan. The cooking surface of this grill has a greater diameter than the fire pan and hence does not provide for an even distribution of heat over the cooking surface.

U.S. Pat. No. 4,683,867 describes a barbecue grill provided with a pair of Z-shaped plates located beneath a food supporting grate within the grill housing. A grease evacuation system comprising circular depressions and drainage channels is located in the bottom of the housing. Grease drippings from food being cooked falls onto the Z-shaped plates and off of the plates' exterior corners into the grease evacuation system below. Grease drippings are not totally diverted away from the heat source since some drippings can splatter through an opening between the plates and through openings on either end of the plates. Furthermore, the unprotected burner unit tends to dry out food placed on the food supporting grate.

The quest therefore continues for the development of a barbecue grill apparatus which eliminates flaming by completely diverting grease drippings away from direct contact with the heat source while simultaneously conserving energy and preserving the natural juices and flavor of food being cooked.

DISCLOSURE OF THE INVENTION

In accordance with the present invention, an improved barbecue grill is provided which solves the problems associated with prior art grill designs and provides for the fuel efficient, flameless cooking of meats and other foods without the depletion of natural juices and flavor from the food being cooked. The novel grill also provides the tasty "barbecue" flavor which outdoor cooks have come to expect from barbecue grills, and it is adapted to further serve as either a steamer or smoker with only minor adjustment thereto by the cook.

The improved barbecue grill of the present invention comprises a housing having a bottom surface, a heat source adjacent the bottom surface, a heat deflecting means positioned above the heat source, a grease collection and drainage system, a food supporting grid, and a hood for enclosing the housing. The heat deflecting means acts to evenly distribute heat throughout the housing and thereby obviate "hot spots", and it further acts to prevent direct contact of the heat source with the grease collection and drainage system and the grease "flaming" that would result therefrom. The grease collection and drainage system acts to prevent grease from contacting the heat source and thereby also helps to prevent undesirable "flaming" while food is being cooked on the grill. The even distribution of heat and elimination of grease from the housing provides for the flameless and fuel efficient cooking of foods without depleting the foods of their natural juices and flavor. The grease collection and drainage system can alternatively be closed off and filled with water so as to readily and conveniently convert the barbecue grill to use as a steamer or smoker.

Accordingly, it is an object of the present invention to provide a barbecue grill which will safely and effectively cook meats and other foods.

Another object of the present invention is to provide a barbecue grill which will eliminate flaming during the cooking process.

Another object of the present invention is to provide a barbecue grill which will utilize gas or any other heat source in a highly efficient manner.

Another object of the present invention is to provide a barbecue grill which will provide for an exceptionally even distribution of heat over the cooking surface.

Yet another object of the present invention is to provide a barbecue grill which will allow the cooking of food, particularly larger pieces of meat, in a timely manner without depleting the natural juices of the food being cooked.

Still another object of the present invention is to provide a barbecue grill which is easily converted to use as a steamer or a smoker.

BEST MODE FOR CARRYING OUT THE INVENTION

Figure 1:
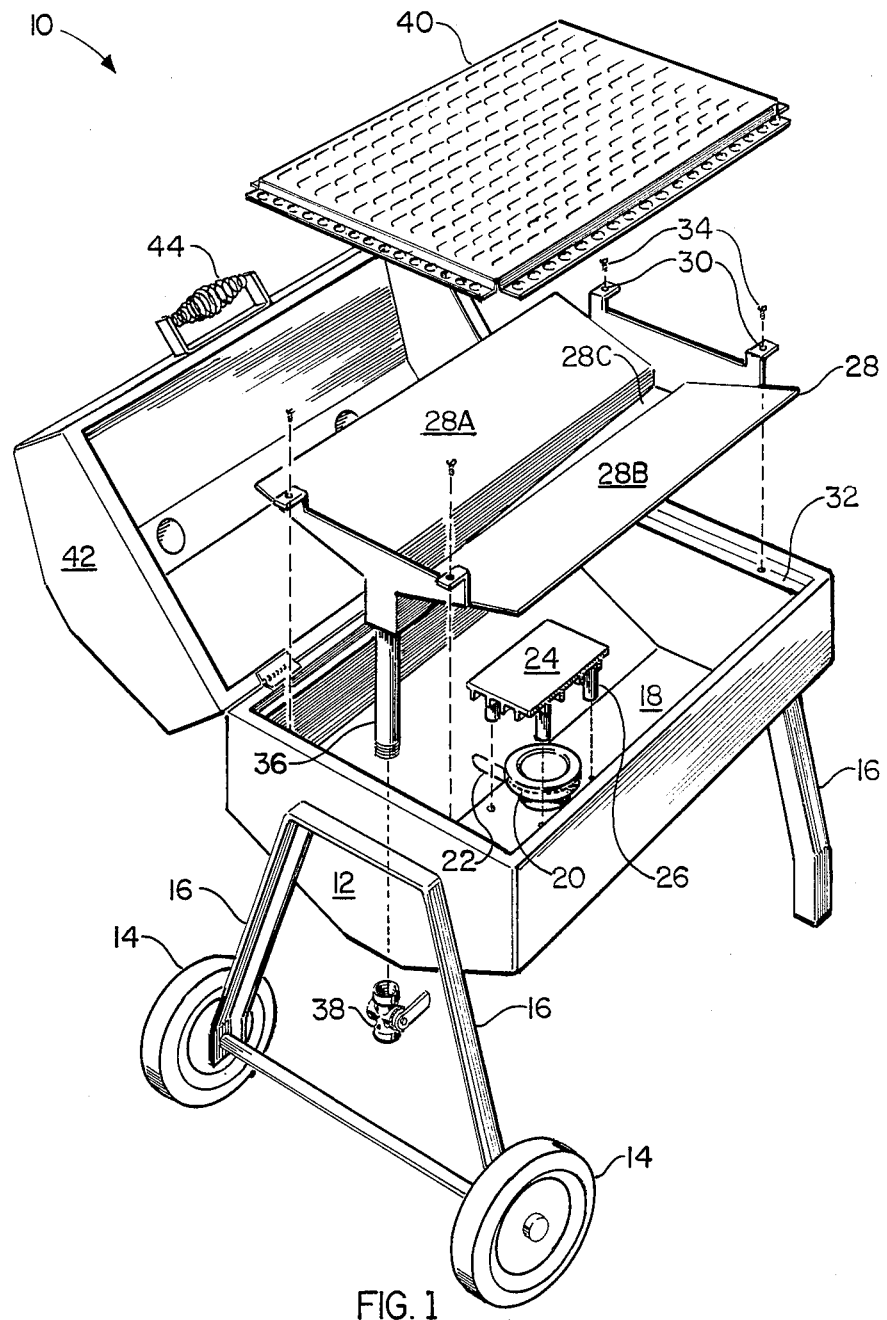
FIG. 1 is an exploded perspective view of the grilling apparatus of the present invention.
Figure 2:
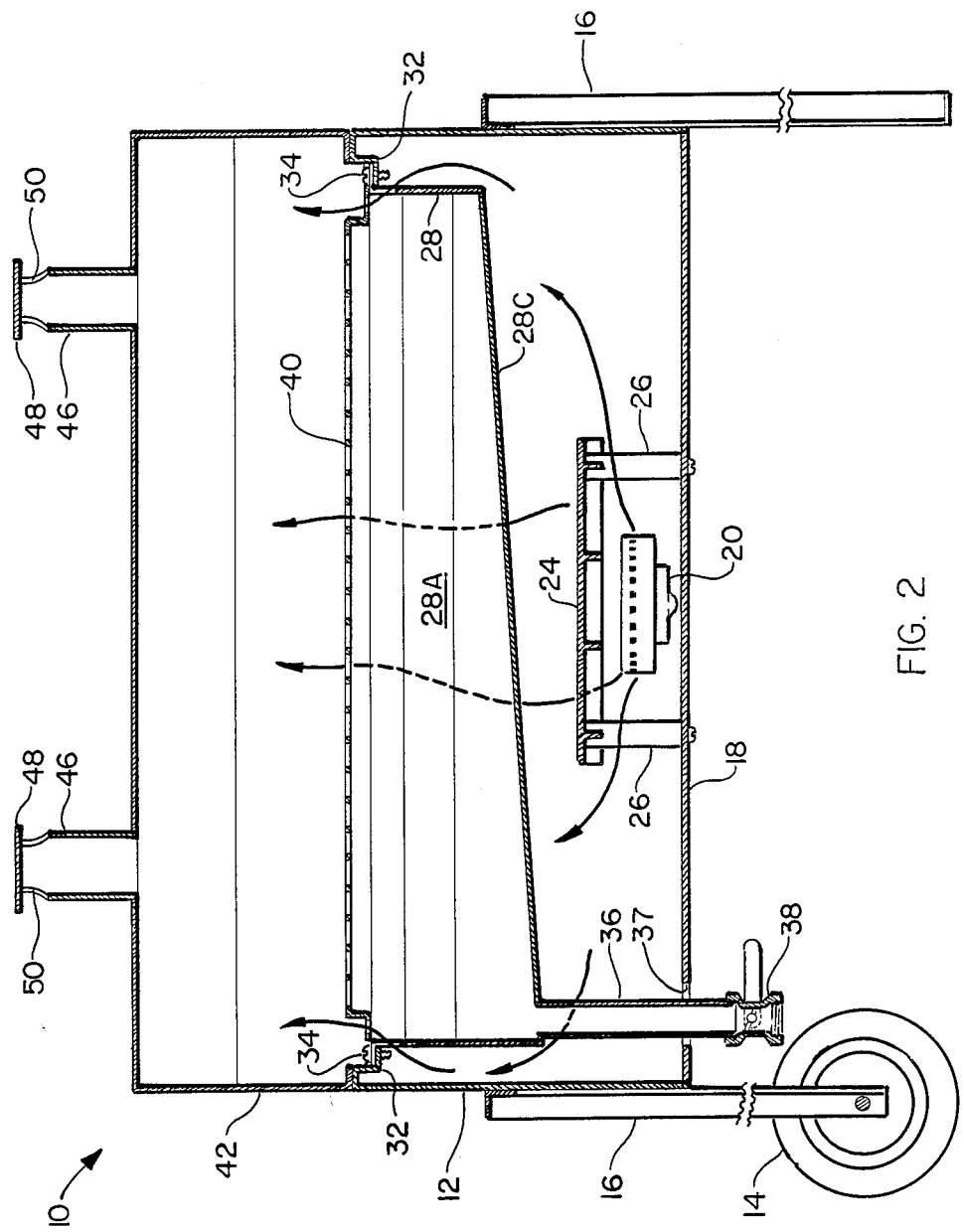
FIG. 2 is a vertical cross section view of the grilling apparatus of the present invention.
Figure 3:
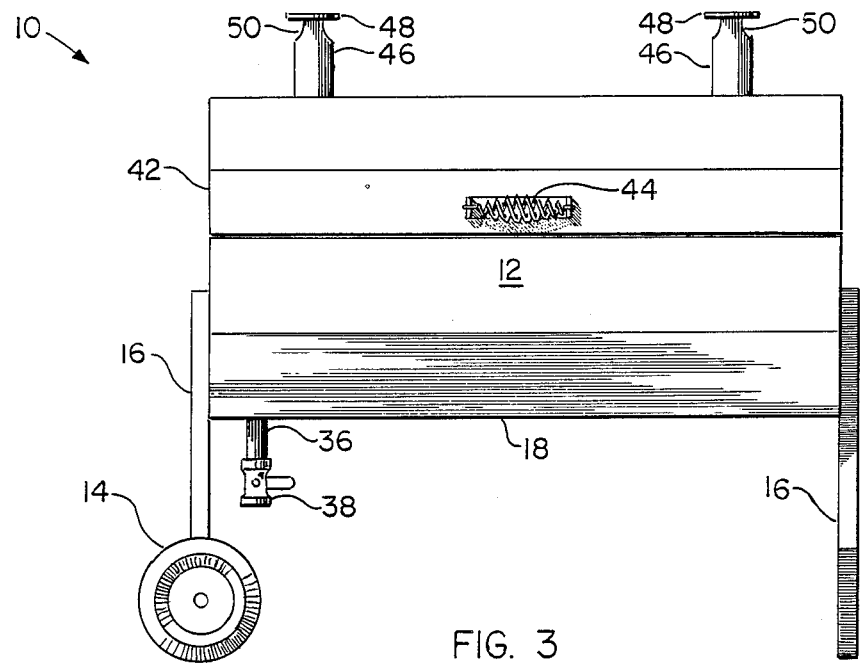
FIG. 3 is side elevation view of the grilling apparatus of the present invention.
Figure 4:
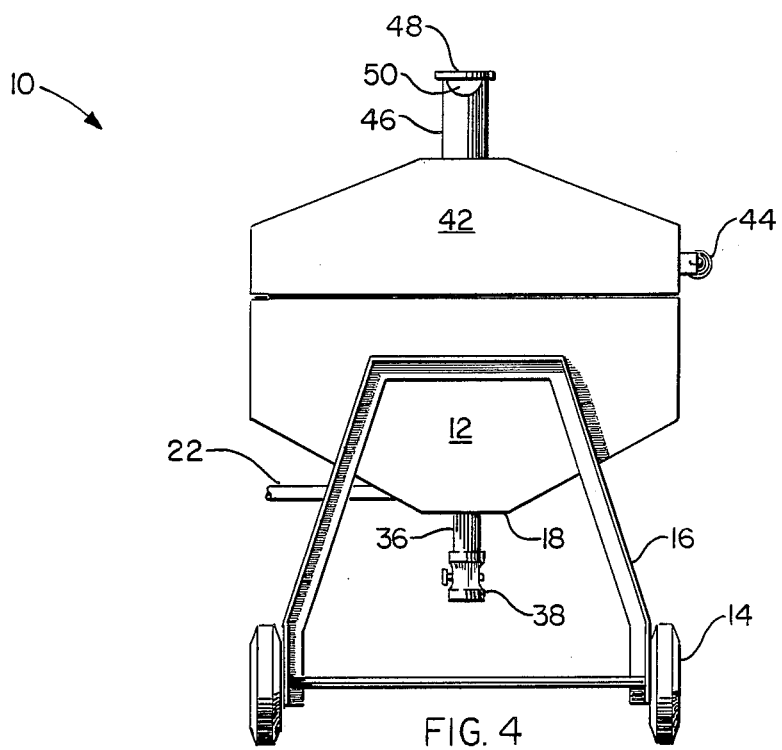
FIG. 4 is an end elevation view of the grilling apparatus of the present invention.

Referring now more specifically to the drawings, a preferred embodiment of the barbecue grill and cooker of the present invention is shown in FIGS. 1-4 and designated generally by the numeral 10. The barbecue grill and cooker 10 comprises a housing 12 most preferably constructed of aluminum and supported by wheels 14 and support legs 16. Housing 12 comprises a bottom surface 18 with a gas burner unit 20 positioned in the center thereof. Gas burner unit 20 is most suitably connected to a propane gas tank (not shown) by way of gas line 22. It should be noted that other types of heat sources could be utilized with the present invention in lieu of gas burner unit 20 such as charcoal briquettes or an electric resistant heat source.

Positioned directly above gas burner unit 20 is a heat deflector plate 24 preferably constructed of cast iron and supported by legs 26. A grease collector 28 preferably constructed of stainless steel is located above heat deflector plate 24 and comprises two downwardly sloping surfaces 28A, 28B and an inclined channel 28C. Grease collector 28 is attached to housing 12 by way of four tabs 30 which are secured to ledge 32 of housing 12 with conventional screws 34. The sides of grease collector 28 are spaced from about ¼ inch to about 2 inches inwardly from the side walls of housing 12 so that heat can travel generally upwardly as shown by the flow-path arrows in FIG. 2.

The lower end of inclined channel 28C has a grease drainage conduit 36 connected thereto which extends downwardly through an opening 37 in the bottom surface 18 of housing 12 and is most suitably constructed of stainless steel. The lower end of grease conduit 36 includes a valve 38 (which is preferably a plastic ball valve) for selectively closing conduit 36 so as to convert barbecue grill and cooker 10 to a steamer or a smoker as will be more fully explained hereinafter.

Located directly above and spaced-apart from grease collector 28 is a food supporting grid 40 which is preferably constructed of stainless steel. A hood 42 is pivotably attached to housing 12 and includes a handle 44 and two chimneys 46. Hood 42 is preferably constructed of aluminum, and chimneys 46 each have a cap 48 thereon with side ports 50 so that barbecue grill and cooker 10 can be operated during inclement weather.

In operation, gas burner unit 20 is ignited and barbecue grill and cooker 10 is allowed to warm up to an appropriate cooking temperature. Food to be cooked is then placed on food supporting grid 40 and hood 42 is pivoted downwardly so as to enclose housing 12. As the cooking process ensues, grease from the food being cooked drops through food supporting grid 40 and onto downwardly sloping surfaces 28A, 28B of grease collector 28 and passes into inclined channel 28C and eventually through grease drainage conduit 36 and out of the bottom of housing 12. Heat deflector 24 creates an even distribution of heat throughout housing 12 by causing the heat to pass generally upwardly through the space between the walls of housing 12 and the sides of grease collector 28 so as to better distribute the heat around food supporting grid 40 and prevent hot spots therein. Also, heat deflector 24 serves to prevent direct contact of the gas flame from burner unit 20 with grease collector 28 and the "flaming" of burning grease which would result while still allowing grease collector 28 to be sufficiently hot to vaporize part of the grease falling thereon to provide smoke for imparting a barbecue flavor to food being cooked. Hood 42 maintains the heat within housing 12, and smoke and exhaust escape through chimneys 46 in the top of hood 42.

The grill design of the present invention totally eliminates flaming and cooks at a higher sustained temperature than conventional gas and electric grills. More specifically, it has surprisingly been found that larger pieces of meat such as chicken, pork roast and hams can be cooked in as little as half the time normally required on conventional gas and electric grills. The unusually even distribution of heat throughout the housing of the grilling apparatus of the present invention results in a highly efficient consumption of fuel and also eliminates the need for turning meat over during the cooking process. Large pieces of meat prepared on the grill of the present invention also tend to have a very high moisture content as compared to those prepared on conventional gas and electric grills.

Alternatively, and very desirably, barbecue grill and cooker 10 can be readily converted to a steamer or a smoker by closing valve 38 and filling grease collector 28 with water. The cooking process can then be carried out so as to steam oysters, vegetables, shell fish and the like. Also, commercially available liquid hickory smoke can be added to the water contained in grease collector 28 in order to smoke turkeys, hams, fish and the like. Barbecue grill and cooker 10 of the present invention is therefore a highly versatile and highly efficient cooking apparatus exhibiting many advantages over conventional gas and electric grills.

It will thus be understood that various details of the invention may be changed without departing from the scope of the invention. Furthermore, the foregoing description is for the purpose of illustration only and not for the purpose of limitation—the invention being defined by the following claims.

What is claimed is:

1. A barbecue grill for cooking food comprising:
   a housing having side walls and a bottom surface;
   heating means adjacent the bottom surface of said housing for providing cooking heat;
   heat-deflecting means positioned above and spaced-apart from said heating means for facilitating even heat distribution within said housing;
   grease collecting means positioned above and spaced-apart from said heat deflecting means;
   grease drainage means fluidly communicating with said grease collecting means and providing means for disposal of grease remote from said housing;
   food supporting means positioned within said housing above and spaced-apart from said grease collecting means; and
   a hood adapted to enclose said housing;
   whereby heat from said heating means within said housing is distributed evenly throughout said housing, and grease from food being cooked is discharged therefrom by said grease collecting and drainage means.

2. A barbecue grill for cooking food according to claim 1 wherein said housing is supported on a plurality of legs.

3. A barbecue grill for cooking food according to claim 1 wherein said heating means comprises charcoal briquettes.

4. A barbecue grill for cooking food according to claim 1 wherein said heating means comprises a gas burner.

5. A barbecue grill for cooking food according to claim 1 wherein said heating means comprises an electric resistance heat source.

6. A barbecue grill for cooking food according to claim 1 wherein said heat deflecting means comprises a metal plate supported by a plurality of leg members.

7. A barbecue grill for cooking food according to claim 1 wherein said grease collecting means comprises two planar surfaces sloping downwardly to a central inclined channel therebetween having an upper end and a lower end, said channel having an aperture at its lower end, and said grease drainage means comprises a drainage conduit fluidly communicating with said aperture and depending downwardly therefrom.

8. A barbecue grill for cooking food according to claim 7 wherein said grease collecting means defines a space around the perimeter thereof between said grease collecting means and said housing to allow heat to pass upwardly therethrough.

9. A barbecue grill for cooking food according to claim 7 wherein said housing has an opening in the bottom thereof to allow said grease drainage conduit to extend therethrough.

10. A barbecue grill for cooking food according to claim 7 wherein said grease drainage conduit includes a valve therein adapted to selectively close said conduit so as to facilitate filling said grease collecting means with water in order to use said grill to steam and smoke food.

11. A barbecue grill for cooking food according to claim 1 wherein at least one chimney is provided in said hood to allow smoke and heat to be exhausted from said housing during cooking.

12. A barbecue grill for cooking food comprising:
a housing having side walls and a bottom surface;
a gas burner adjacent the bottom surface of said housing for providing cooking heat;
a heat-deflecting plate positioned above and spaced-apart from said gas burner for facilitating even heat distribution within said housing; grease collecting means removably positioned above
and spaced-apart from said heat deflecting plate, said grease collecting means comprising two planar surfaces sloping downwardly to a central inclined channel therebetween having an upper end and a lower end, said channel having an aperture at its lower end;
a grease drainage conduit connected at one end to said aperture in the lower end of said inclined channel and depending downwardly therefrom through the bottom surface of said housing;
a food supporting grid positioned within said housing above and spaced-apart from said grease collecting means; and
a hood adapted to enclose said housing;
whereby heat from said gas burner within said housing is distributed evenly throughout said housing, and grease from food being cooked drops onto the planar surfaces of said grease collecting means and travels downwardly into the inclined channel therein and out of said housing through said grease drainage conduit.

13. A barbecue grill for cooking food according to claim 12 wherein said housing is generally rectangular in shape with four sides and a rectangular bottom surface, and said housing is supported on a plurality of legs.

14. A barbecue grill for cooking food according to claim 12 wherein said heat deflecting plate comprises a flat metal plate resting on four corner legs supported by the bottom surface of said housing.

15. A barbecue grill for cooking food according to claim 12 wherein said housing is generally rectangular in shape having four side walls and a rectangular bottom surface, and wherein said grease collecting means is also generally rectangular in shape and positioned within said housing so that each side of said grease collecting means is spaced-apart from each corresponding side wall of said housing to allow heat from said gas burner to pass upwardly around the sides of said grease collecting means.

16. A barbecue grill for cooking food according to claim 15 wherein each side of said grease collecting means is spaced from about $\frac{1}{4}$ inch to about 2 inches inwardly from each corresponding side wall of said housing.

17. A barbecue grill for cooking food according to claim 12 wherein said grease drainage conduit includes a valve therein adapted to selectively close said conduit so as to facilitate filling said grease collecting means with water in order to use said grill to steam and smoke food.

18. A barbecue grill for cooking food according to claim 12 wherein said hood is pivotably attached to said housing and includes at least one chimney to allow smoke and heat to be exhausted from said housing during cooking.

19. A barbecue grill for cooking food according to claim 18 wherein two spaced-apart chimneys are provided in said hood.

20. A barbecue grill for cooking food according to claim 12 wherein said housing and hood are fabricated from aluminum, said heat deflector plate is fabricated from cast iron, and said grease collecting means, drainage conduit and said food supporting grid are fabricated from stainless steel.

* * * * *